(12) United States Patent
Magagnin et al.

(10) Patent No.: US 10,594,150 B2
(45) Date of Patent: Mar. 17, 2020

(54) PULSE DISCHARGE SYSTEM

(71) Applicants: Politecnico Di Milano, Milan (IT); Manodya Limited, Dublin (IE)

(72) Inventors: Luca Magagnin, Milan (IT); Vincenzo Tirella, Dublin (IE)

(73) Assignees: Manodya Limited, Dublin (IE); Politecnico Di Milano, Milan (IT)

( * ) Notice: Subject to any disclaimer, the term of this patent is extended or adjusted under 35 U.S.C. 154(b) by 0 days.

(21) Appl. No.: 15/991,819

(22) Filed: May 29, 2018

(65) Prior Publication Data

US 2018/0366968 A1 Dec. 20, 2018

Related U.S. Application Data

(63) Continuation-in-part of application No. 15/137,604, filed on Apr. 25, 2016, now Pat. No. 10,110,023, (Continued)

(51) Int. Cl.
*H02J 7/34* (2006.01)
*H02J 7/00* (2006.01)

(52) U.S. Cl.
CPC ............ *H02J 7/0063* (2013.01); *H02J 7/007* (2013.01); *H02J 7/008* (2013.01); *H02J 7/0013* (2013.01);
(Continued)

(58) Field of Classification Search
CPC ........ H02J 7/0063; H02J 7/0013; H02J 7/007; H02J 2007/0067
(Continued)

(56) References Cited

U.S. PATENT DOCUMENTS 5,481,174 A 1/1996 Martin et al.
6,043,628 A 3/2000 Perelle et al.
(Continued)

FOREIGN PATENT DOCUMENTS

EP 0769837 4/1997
JP 2000-324709 A 11/2000
(Continued)

OTHER PUBLICATIONS

"U.S. Appl. No. 15/137,604, Final Office Action dated Mar. 8, 2018", 10 pgs.
(Continued)

*Primary Examiner* — Ryan Jager
(74) *Attorney, Agent, or Firm* — Schwegman Lundberg & Woessner, P.A.

(57) ABSTRACT

A power supply system can include an electrical battery for supplying electrical load using pulse discharge; and a control unit to control the electrical battery to pulse discharge by periodically switching between a discharge state of the electrical battery, when the electrical battery is connected to the electrical load, and a rest state of the electrical battery when the electrical battery is disconnected from the electrical load. During the pulse discharge, the control unit can control a power source for supplying an injection current to the electrical battery during a rest period when the electrical battery is in the rest state. The control unit can further determine the voltage of the electrical battery during the rest state, and when the voltage does not meet a threshold value increase the duration of the rest period, until said threshold value is reached. Other systems, methods and apparatuses are described.

18 Claims, 13 Drawing Sheets

Related U.S. Application Data which is a continuation of application No. PCT/EP2015/058889, filed on Apr. 24, 2015.

(52) U.S. Cl.
CPC .......... *H02J 7/0022* (2013.01); *H02J 7/0068* (2013.01); *H02J 7/0093* (2013.01); *H02J 2007/0067* (2013.01)

(58) Field of Classification Search
USPC .......................................................... 307/20
See application file for complete search history.

(56) References Cited

U.S. PATENT DOCUMENTS

| | | | |
|---|---|---|---|
| 6,087,039 | A | 7/2000 | Van Lerberghe |
| 6,340,879 | B1 | 1/2002 | Blacker |
| 6,741,065 | B1 * | 5/2004 | Ishii .................... B60L 11/1816 320/122 |
| 9,379,549 | B2 * | 6/2016 | Sakuma .................... H02J 3/32 |
| 10,110,023 | B2 | 10/2018 | Magagnin et al. |
| 2007/0259218 | A1 | 11/2007 | Tung et al. |
| 2007/0268001 | A1 * | 11/2007 | Doll .................... H02J 7/0024 320/134 |
| 2009/0295330 | A1 * | 12/2009 | Li .................... H02J 7/0013 320/124 |
| 2010/0117452 | A1 * | 5/2010 | Dunnmon ................. H02J 1/10 307/72 |
| 2010/0164430 | A1 | 7/2010 | Lu et al. |
| 2013/0033114 | A1 | 2/2013 | Lee et al. |
| 2013/0175975 | A1 * | 7/2013 | Shinozaki ........... B60L 11/1864 320/106 |
| 2013/0346762 | A1 | 12/2013 | Hodges et al. |
| 2014/0312828 | A1 | 10/2014 | Vo et al. |
| 2016/0315485 | A1 | 10/2016 | Magagnin et al. |
| 2017/0054184 | A1 | 2/2017 | Tanabe et al. |
| 2017/0229876 | A1 | 8/2017 | Jhunjhunwala et al. |

FOREIGN PATENT DOCUMENTS

| | | |
|---|---|---|
| WO | WO-1993015543 | 8/1993 |
| WO | WO-9703489 A1 | 1/1997 |
| WO | WO-1998031088 | 7/1998 |
| WO | WO-0137393 A1 | 5/2001 |
| WO | WO-2009146337 A1 | 12/2009 |
| WO | WO-2010076608 | 7/2010 |
| WO | WO-2012163661 A1 | 12/2012 |

OTHER PUBLICATIONS

"U.S. Appl. No. 15/137,604, Non Final Office Action dated Nov. 6, 2017", 11 pgs.
"U.S. Appl. No. 15/137,604, Response filed Feb. 5, 2018 to Non Final Office Action dated Nov. 6, 2017", 9 pgs.
"U.S. Appl. No. 15/137,604, Response filed May 8, 2018 to Final Office Action dated Mar. 8, 2018", 9 pgs.
"International Application Serial No. PCTEP2015058889, International Search Report dated Dec. 21, 2015", 5 pgs.
"International Application Serial No. PCTEP2015058889, Written Opinion dated Dec. 21, 2015", 9 pgs.
"International Application Serial No. PCTEP2016/059209, International Search Report dated Jun. 28, 2016", 4 pgs.
"United Kingdom Application No. GB1607170.6, Combined Search and Examination Report dated Nov. 24, 2016", (Nov. 24, 2016), 7 pgs.
"International Application No. PCT/EP2019/063458, International Search Report and Written Opinion dated Jul. 16, 2019", (Jul. 16, 2019), 15 pgs.
"U.S. Appl. No. 15/137,604, Notice of Allowance dated Jun. 22, 2018", 5 pgs.

* cited by examiner

PULSE DISCHARGE SYSTEM

CLAIM OF PRIORITY

This application is a continuation-in-part of and claims the benefit of priority of U.S. patent application Ser. No. 15/137,604, filed on Apr. 25, 2016, entitled "POWER SUPPLY SYSTEM," which claims the benefit of priority of PCT Patent Application No. PCT/EP2015/058889, filed on 24 Apr. 2015, entitled "DEVICE FOR DRIVING AN ELECTRICAL LOAD," which applications and publication are incorporated by reference as if reproduced herein and made a part hereof in their entirety, and the benefit of priority of each of which is claimed herein.

Embodiments relate to a pulse discharge power supply system comprising an electrical battery for supplying an electrical load. In particular, embodiments relate to a pulse discharge power supply system and/or control system that can enhance the efficiency of operation of a battery.

BACKGROUND

Batteries are ubiquitous in modern day technology. Batteries are available in a wide range of types, each specialised for particular applications, from small button cell batteries used in watches, larger Li-ion batteries used in mobile devices, to large industrial scale batteries. There is often a trade-off between the physical size of the battery versus the capacity required for the battery's application, the two of which are directly related.

An important subclass of batteries is rechargeable batteries, which provide the functionality of being able to be used repeatedly. Rechargeable batteries are the power source of choice for most portable applications, from cellphones and tablets, to electric motors for hybrid or electric vehicles. However, their limited capacity means that once their charge is expended they need to be connected to an external power source in order to be recharged. For applications such as hybrid or electric vehicles this puts a limit on the range these vehicles can travel before having to be recharged, which may be less than desirable.

For cellphones, balancing the desire for batteries to be light and portable against the power drain of large LED displays and power hungry processors, leads to batteries that have to be charged almost daily. The charging process for these batteries is time consuming, typically requiring a few hours for a full charge. It is not always desirable to have to recharge these devices this frequently.

Rechargeable batteries may also be used in grid or microgrid situations. Where the batteries are used as a mains power supply, or to supplement the mains supply, such as backup equipment.

In addition, rechargeable battery performance can deteriorate as repeated charge and discharge cycles lead to damage to the battery's electrodes. Causes of such deterioration include sulfation and grid corrosion for lead acid batteries, cell oxidation for Li-ion batteries, and crystal formations for Li-ion and nickel-based batteries. These result in it becoming harder for the battery to regain its initial charge with the capacity of the battery depleting over time.

There is therefore a need to improve the functionality of batteries in order to increase their capacity. In addition, more efficient charge and discharge cycles are desirable in order to keep up with development in electronics.

SUMMARY

According to an aspect there is provided a power supply system for supplying an electrical load using pulse discharge, the system comprising; a first electrical battery for supplying said electrical load using pulse discharge; and a control unit configured to control the first electrical battery to pulse discharge by periodically switching between a discharge state of the first electrical battery, when the first electrical battery is connected to said electrical load, and a rest state of the first electrical battery when the first electrical battery is disconnected from said electrical load; said control unit being further configured to during the pulse discharge control a power source for supplying a first injection current to the first electrical battery during a rest period when the first electrical battery is in the rest state; said control unit further configured to determine the voltage of the first electrical battery during the rest state, and when the voltage does not meet a threshold value increase the duration of the rest period, until said threshold value is reached.

It has been found that a power supply system configured to operate in this manner can improve the efficiency of the electrical battery. Periodically switching between a discharge state and a rest state can increase the working time of the electrical battery in comparison to a system that involves continuous discharge, due to the battery recovery effect. The efficiency of the battery can be increased further by during the pulse discharge controlling the power source to supply an electrical injection current during a rest period when the first electrical battery is in the rest state.

However, a further surprising effect is that the efficiency is improved further through the variation of the length of the rest period when the battery is in the rest state when the open voltage of the battery drops below a certain threshold level. This provides a further enhancement in efficiency not explained by the battery recovery effect.

One possible consequence of the improved efficiency is that the battery may need to be recharged less often. The battery remains at a higher charge state for longer and so the amplitude of any recharge (i.e. the amount of energy required for a recharge) is reduced. This may offer a further advantage because being recharged less often may lead to less degradation of the battery, increasing battery lifetime over consecutive charge/discharge cycles.

In some applications, eventually after successive pulse discharge cycles the battery may require a full recharge back to its nominal voltage. It is important to note that the injection current and the recharge current are not the same, in that the purpose of the injection current is to achieve the increase in efficiency, not just to bring the charge of the battery to its nominal voltage. Typically, the injection current is not enough to fully recharge the battery during the pulse discharge cycles back to its initial voltage capacity. As stated above, having a variable rest period over successive cycles the battery can last much longer before being fully discharged.

In the present system the total charge provided by the combined injection currents for each cycle may be a significantly smaller than the charge required for a full recharge of the battery to its original capacity. In addition the size of the charge provided by the injection current to the battery for a particular pulse discharge cycle may be significantly less than the size of the charge delivered from the battery when it is discharged during a pulse discharge cycle. In other words the partial charge supplied to the battery during a pulse discharge cycle supplied by the injection current, is smaller than the charge supplied by the battery during the discharge period for a single pulse discharge cycle.

However, it should be understood that in alternative embodiments where the power supply system is required to operate indefinitely the charge supplied by the injection current may operate at a level similar to a full recharge current.

A further advantage of the power supply system is that the periodic alternating between a discharge state and a rest state and increasing length of the rest period results in a lower operating temperature of the battery. During discharge batteries may generate heat which can enhance degradation to battery components. Alternating between the discharge state and the rest state and increasing the length of the rest period when the battery voltage drops may mean that the increase in temperature of the battery is less than for continuous discharge, or even pulse discharge having a fixed length of rest phase.

The power supply system can be used in an electrical energy storage system, such as, for example, a storage battery present in a photovoltaic system (for example, of the domestic type) or a flow battery, which may not require constant power output. It may be used for stationary or mobile application. This may include grid or microgrid usage. Other usages include large energy storage, UPS batteries, smart grids, power stations for hybrid and electric vehicles. Advantageously, the present system is preferable for uses where fast charge may be required.

Preferably, the control unit is configured such that the threshold value is a minimum threshold voltage. In this way, each time the battery is discharged it has an initial voltage at the start of the discharge state of at least this minimum threshold voltage. This is advantageous for loads where it is essential that the battery has a set voltage value. Maintaining the battery voltage at a specific level may mean that the battery is maintained at a high level of charge. This means no or fewer full recharges are required. This may lead to less degradation of the battery as described above.

The minimum threshold voltage may be over 90% of the nominal voltage of the battery, i.e. the maximum battery voltage. Preferably the minimum threshold voltage is at least 95% of the nominal voltage of the battery, and more preferably at least 97%.

Preferably, the control unit is further configured to determine the voltage at fixed time intervals during the rest state to determine when the threshold value has been reached. In this way, if the threshold value is not reached after the first determination, then subsequent determinations can be carried out at later time intervals until the threshold value is reached. This enables the rest period to be extended until the threshold value is met. The determination may be carried out at fixed time intervals. For instance, this may be every 1 s, 5 s, or 10 s commencing from the start of the rest period. In some embodiments, when the threshold value is met no further subsequent determinations are carried out during that specific rest period. This limits the computational resources required by the control unit, as once the threshold value is met no further measurements are required for that particular cycle. Alternatively, in other embodiments, the determinations are carried out at fixed time intervals throughout the rest period, even if the threshold value has been met. In this way, the voltage recovery across the entire rest period can be acquired.

In some embodiments, the control unit determines the difference between the voltage determined at two time intervals, and compares the difference to the threshold value to determine when the threshold value is reached. In this way, the recovery of the voltage of the battery can be used as a measure to determine when the threshold value is met. This provides an indication of when the recovery of the voltage has reached a plateau such that further increase in the length of the rest period will not have measurable increase in the battery's capacity. The comparison may be at two consecutive time intervals.

The increase in the rest period may involve an increase in the length of time the injection current is applied. Increasing the length of time that the injection current is applied may help enable the battery to maintain a higher state of charge over continuous cycles. The increase in rest period may involve an increase in both the length of time the injection current is applied and the length of time that the battery is in the rest state with no injection current applied. Alternatively, the increase in the rest period may only involve the increase in the length of time that the injection current is applied, or only an increase in the length of time that the battery is in the rest state with no injection current applied.

In one arrangement, the control unit is configured to control the power source to supply injection current to the electrical battery only during the rest period. Alternatively, or in addition, the control unit is further configured to control the power source for supplying said injection current to the electrical battery: from the beginning of the rest period; at the end of the rest period; throughout substantially the entire rest period; only during a portion of the rest period and/or intermittently during the rest period.

The control unit may be configured to control the power source to supply a varying injection current to the electrical battery. This varying current can change over the portion of the current injection period. Alternatively, the injection current can vary between different current injection periods during one rest period. Alternatively, the control unit may be further configured to control the power source to supply a continuous injection current to the electrical battery.

Preferably, the control unit is further configured to control the power source such that even if the threshold value is met, the rest period has a fixed minimum duration. This ensures that the battery is in the rest state for sufficient time to take advantage of the battery recovery effect. In some instances, the minimum duration of the rest period is equal to the length of the discharge period when the battery is in the discharge state, i.e. a 50% duty cycle. Thus, the rest period and the discharge period may initially be equal, and over successive pulse discharge cycles once the voltage does not meet the threshold value, the length of the rest period may be increased such that it is longer than the discharge period.

The power supply system may comprise a second electrical battery. The control unit may be further configured to control the second electrical battery for periodically switching between a discharge state of the second electrical battery and a rest state of the second electrical battery. Advantageously, having a second electrical battery provides a further energy source for the power supply. A third and further electrical batteries may be provided as required by the circumstances.

Preferably, the control unit is configured to periodically switch between the first and the second electrical batteries to alternate between the discharge state of the first battery and the discharge state of the second electrical battery. Advantageously, the power source alternates between supplying current to the load from a first battery whilst the second battery is in its rest state, and to the power source supplying current from the second battery to the load, whilst the first battery is in its rest state. This may be useful in applications that require a constant supply of electrical power. Preferably, the electrical output across the load from the power supply system is substantially continuous.

Preferably, the control unit is further configured to control the power source to supply a second injection current to the second electrical battery during a rest period when the second electrical battery is in the rest state. Supplying a current to the second battery during its rest state results in an increase in efficiency of the power supply system compared to conventional pulse discharge as discussed above.

The control unit may be further configured to determine the voltage of the second electrical battery during the rest state of the second electrical battery, and when the voltage does not meet the threshold value increase the duration of the rest period of the second electrical battery until said threshold value is reached. This has the surprising effect as outlined above of increasing the efficiency of the battery. The above features discussed in relation to the first electrical battery can be equally applied to the second, or multiple electrical batteries.

Preferably, the batteries can be any type of electrochemical accumulator of electrical energy. Any of the batteries can be a rechargeable battery or a primary battery. More preferably the first or second or third battery is any of: a NiHM battery, a lead acid battery, a NiCd battery, a Li-ion battery, a LIPO battery, a supercapacitor, an electrolytic capacitor, a flow battery. In a specific power supply system the plurality of batteries may be of different types.

Each of the batteries may be represented by a bank of a plurality of batteries connected in series, where the voltage across the terminals of the battery bank is equal to the sum of the voltages across the serial connection of the plurality of batteries. Alternatively, the battery may be a bank of one or more batteries connected in parallel, wherein the voltage across the terminals of the battery bank is equal to the voltage across the terminals of each battery. The bank of batteries supplies current to the load during the discharge phase.

The electrical load can be any of: a printed circuit board inside a smartphone or tablet or laptop or music player, the electric motor of an electric or hybrid vehicle, a system for storing electrical energy, an electrical energy distribution network (for example of the "smart grid" type).

Preferably, in a power supply system comprising two equivalent batteries, the switching cycles may be approximately inverse to one another. Thus, while one of the batteries is connected to the load the other is discharging. Advantageously, for the power supply system comprising two or more batteries this may enable the power system to provide a continuous power output. For instance, the duty cycle for four batteries may be 25%, rather than 50% for two batteries.

The voltage may be determined by measuring the voltage, for instance using a voltmeter, or any other device which enables voltage to be measured. In some embodiments, the device for measuring the voltage may be integrated into the control unit. In other embodiments, the device for measuring the voltage may be separate to the control unit and a signal indicating the voltage value may be sent from the device to the control unit, such that the control unit can use this for the determination of whether to increase the rest phase.

The power source may be any of electric motor, the output of an inverter, a kinetic energy recovery system (KERS), a photovoltaic panel, or a battery. Advantageously, the range of power sources can be adapted for the specific use of the power supply system. KERS and photovoltaic panels are green sources. This is advantageous as these sources may not provide a continuous output sufficient to drive a load. However, they provide current sufficient for applying to the battery during the rest phase. This has a positive impact on the environment compared to non-green sources.

In another aspect there is provided a control unit comprising a processor (otherwise known as a CPU) and a switching generator configured to generate a switching signal for periodically switching between a discharge state of a first electrical battery and a rest state of said first electrical battery; wherein the control unit is further configured to generate a power signal for controlling a power source to supply an injection current to the first electrical battery when the first electrical battery is in the rest state wherein the control unit is further configured to determine the voltage of the first electrical battery during the rest state, and when the voltage does not meet a threshold value increase the duration of the rest period until said threshold value is reached.

According to another aspect there is provided a method of controlling a battery and a power source comprising the steps of: periodically switching between a discharge state of a first electrical battery, when the first electrical battery is connected to said electrical load, and a rest state of the first electrical battery when the first electrical battery is disconnected from said electrical load; and controlling a power source for supplying a first injection current to the first electrical battery during a rest period when the first electrical battery is in the rest state, and determining the voltage of the first electrical battery during the rest state, and when the voltage does not meet a threshold value increasing the duration of the rest period until said threshold value is reached.

According to another aspect there is provided a method of supplying an electrical load using pulse discharge, the method comprising the steps of: providing a first electrical battery for supplying said electrical load; periodically switching between a discharge state of the first electrical battery, when the first electrical battery is connected to said electrical load, and a rest state of the first electrical battery when the first electrical battery is disconnected from said electrical load; supplying a first injection current to the first electrical battery during a rest period when the first electrical battery is in the rest state; and determining the voltage of the first electrical battery during the rest state, and when the voltage does not meet a threshold value increasing the duration of the rest period until said threshold value is reached.

In other embodiments, rather than using the voltage to determine if a threshold value is met, other properties of the battery may also be used. For instance, this may include a threshold value based on the state of charge (SoC) or depth of discharge (DoD), which may be determined in the same ways as described above.

Embodiments relate to a pulse discharge system wherein the battery of a power supply system can be supplied with a current during the rest phase of the pulse discharge, and when the voltage of the battery drops below a certain threshold the duration of the rest period is increased. This power supply system allows for a fixed voltage interval at a constant current more electrical power to be provided over a longer working time.

DETAILED DESCRIPTION

Figure 1A:
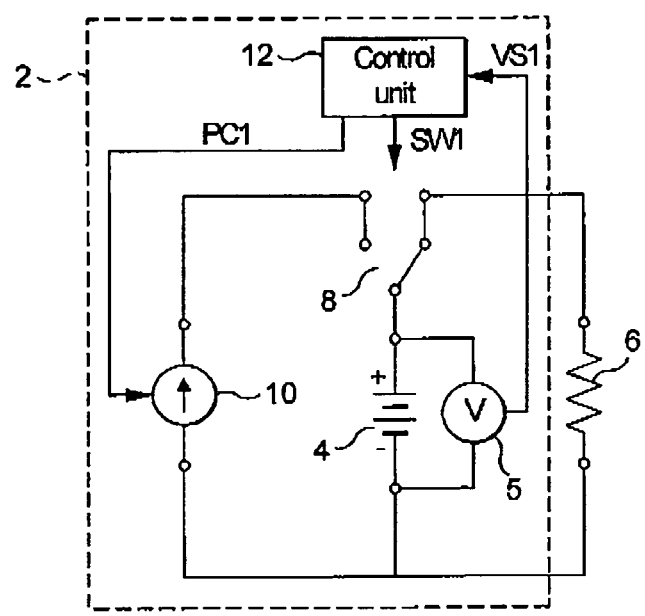
FIGS. 1A and 1B show simplified circuit diagrams of an example power supply system in an embodiment.
Figure 1B:
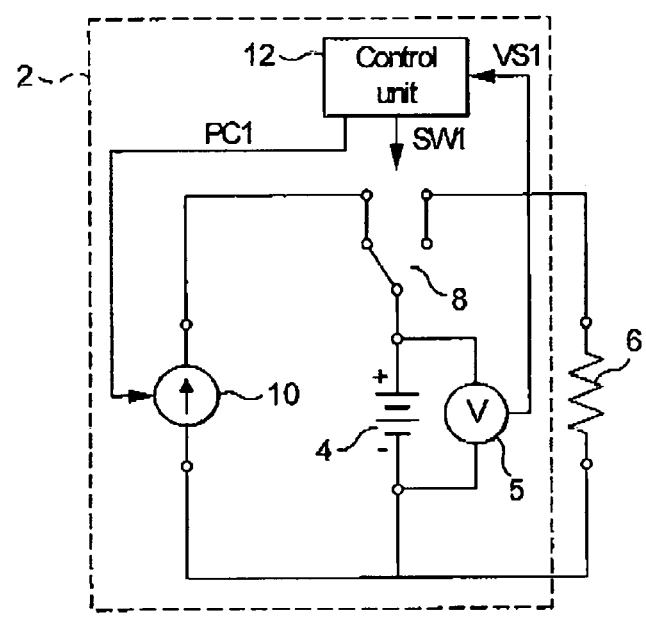

FIGS. 1A and 1B are simplified circuit diagrams of an example power supply system 2. The power supply system 2 includes a battery 4 which is connected in series to a load 6 by a two way switch 8. The power supply 2 system drives the load by supplying an electrical current. A power source 10 is connected to the other terminal of the two way switch 8. FIG. 1A shows the circuit in the configuration where the two-way switch 8 is connected to the load 6 so that the battery 4 supplies power to the load 6. FIG. 1B shows the alternative arrangement where the two way switch 8 is connected to the power source 10 so that the battery 4 can be recharged. The control unit 12 is configured to generate a switching signal SW1. The switching signal SW1 activates the switch 8 causing it to switch periodically between its two positions.

In FIG. 1A when the switch 8 is closed between the battery 4 and the load 6, current flows from the battery 4 to the load 6. This results in a discharge of the battery 4 during the time period that it is connected to the load 6. The switch 8 is open between the battery 4 and the power source 10, and therefore the power source 10 does not supply any electrical current to the battery 4.

In FIG. 1B the switching signal SW1 generated by the control unit 12 has caused the switch 8 to change orientation compared to in FIG. 1A. The switch 8 is now open between the battery 4 and the load 6. In this case the battery 4 is no longer connected to the load 6 and no current flows from the battery 4 to the load 6. The battery 4 is no longer discharging and is in a rest state. The switch 8 is closed between the battery 4 and power source 10; the power source 10 can then supply current to the battery 4 for a portion of the time that it is connected.

The control unit 12 further controls the power source 10 to supply an electric current for a certain period during the rest state by generating a power control signal PC1 to control the power source between an ON and an OFF state. The power source 10 is connected to the terminals of the battery 4 such that the supply of current to the battery 4 from the power source 10 causes a charging effect to occur.

The control unit 12 causes periodic switching of the switch 8 during discharge of the battery 4. This creates a pulsed discharge of the battery 4 with charging during a portion of the rest state.

The power supply system 2 further includes a voltmeter 5 that is in connection with the control unit 12. The voltmeter 5 measures the voltage of the battery 4 and sends signal VS1 indicating the voltage to control unit 12. This enables the control unit 12 to control the periodic switching of switch 8 when the voltage of the battery drops below a threshold minimum level, resulting in an increase in the length of time that the battery is in the rest state.

Figure 2A:
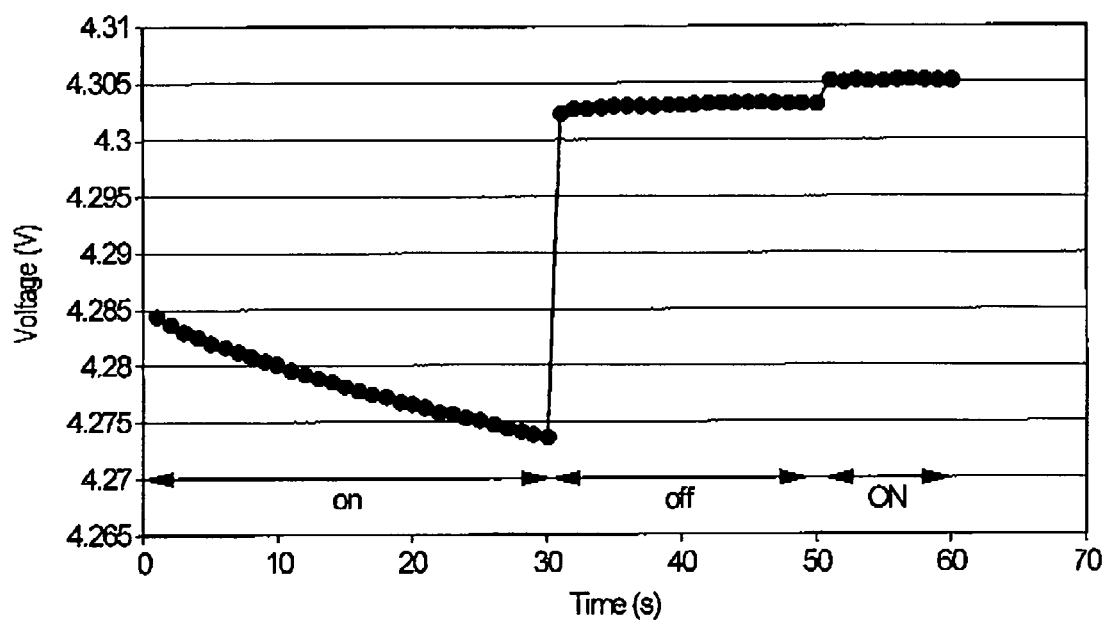
FIG. 2A is a graph showing the voltage across a battery terminal during one switching cycle for the example power supply system as shown in FIGS. 1A and 1B.

FIG. 2A is a graph showing the voltage across a battery 4 terminal during one switching cycle for the power supply system 2. At t=0 the battery 4 is connected to the load 6 and starts discharging. Between t=0 and t=30 s the battery 4 is connected to the load 6 and is in the discharge state for a discharge period, $T_{on}$. During the discharge period the voltage across the battery 4 decreases. At t=30 s the battery 4 is disconnected from the load 6 when the two-way switch 8 is switched to its alternate position. The battery 4 remains disconnected from the load 6 in this rest state for a rest period between t=30 s and t=60 s. At the beginning of the rest period the voltage across the battery 4 increases rapidly, since the load 6 has been disconnected. The voltage across the battery 4 then increases gradually over the remainder of the rest period. Between t=50 and t=60 a current is injected into the battery 4 by the power source 10 under control of the control unit 12. This is termed a current injection period, and it results in an additional voltage increase across the battery 4. The rest period therefore comprises a recovery period during which the battery 4 is disconnected from the load 6 but is not supplied with a current, and a current injection period where the battery 4 is disconnected from the load 6 and a current is supplied by the power source 10.

The switching cycle has a switching period $T_c$ that is defined as the sum of the discharge period $T_{on}$, and the rest period $T_r$. As explained above, the rest period comprises the recovery period $T_{off}$ and the current injection period $T_{ON}$. Thus:

$$T_r = T_{off} + T_{ON}$$

and $$T_c = T_r + T_{on}$$

Figure 2B:
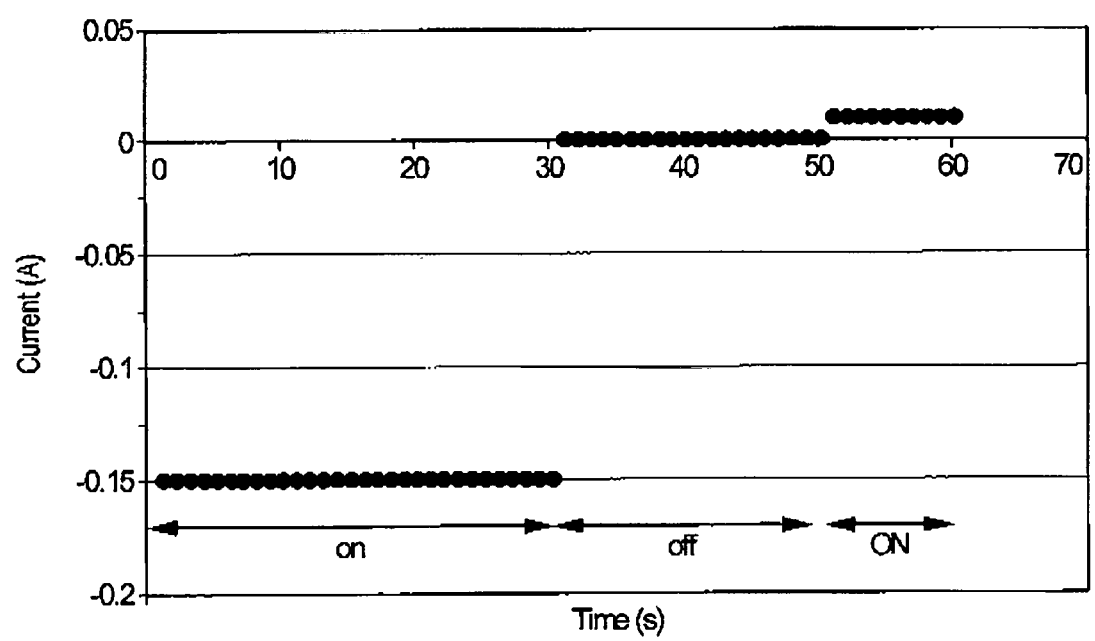
FIG. 2B is a graph showing the current with respect to the battery terminal during one switching cycle for the power supply system as shown in FIGS. 1A and 1B.

FIG. 2B is a graph showing the current supplied at one of the terminals of the battery 4 for one switching cycle. Between t=0 and t=30 during the discharge period the battery 4 discharges at constant current ($I_{on}$). Between t=30 and t=50 (the recovery period) the battery 4 is disconnected from the load 6, and no current is supplied to the battery 4 from the power source 10; therefore, during the recovery period the current is zero ($I_{off}=0$). Between t=50 and t=60 (the current injection period) a current is supplied to the battery 4 by the power source 10; the current measured at the terminal of the battery 4 during the current injection period $I_{ON}$.

Figure 3A:
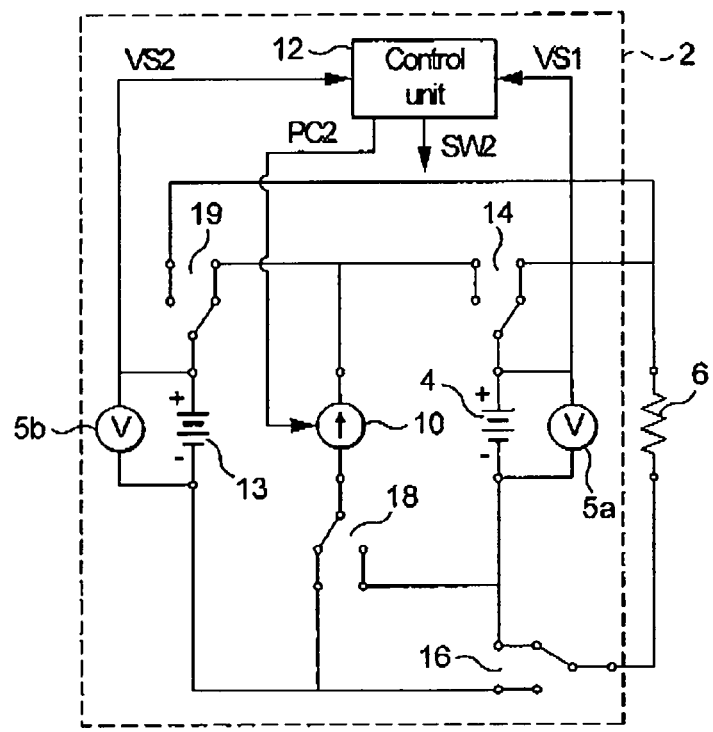
FIGS. 3A and 3B show simplified circuit diagrams of a second example of a power supply system in another embodiment.
Figure 3B:
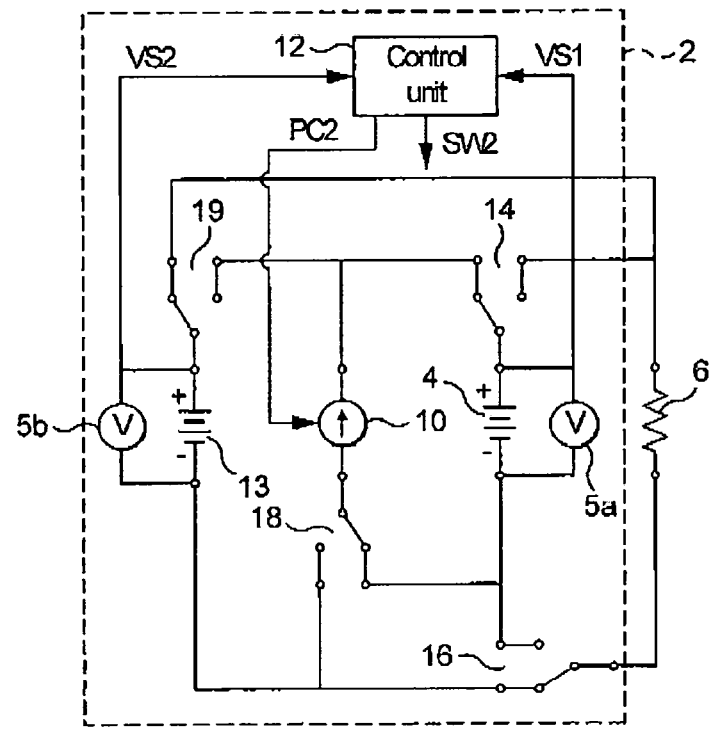

FIGS. 3A and 3B show simplified circuit diagrams of another example of a power supply system 2 for supplying an electrical current to a load 6. The power supply system 2 includes a second battery 13, in addition to the first battery 4 as shown in the example power supply system 2 in FIGS. 1A and 1B.

As is apparent from FIG. 3A, the first battery 4 can be connected in series with the load 6 by selected operation of two-way switches 14, 16. The second battery 13 is connected in series with the power source 10 through selected operation of two-way switches 18, 19. It is noted that, with the two-way switches 14, 16, 18, 19 in the configuration shown in FIG. 3A, the second battery 13 is disconnected from the load 6, and the first battery 4 is disconnected from the power source 10.

Voltmeters 5a and 5b in communication with the control unit 12 are connected to the first battery 4 and the second battery 13, respectively.

FIG. 3B shows an alternative switching configuration. In this arrangement the first battery 4 is connected in series to the power source 10 through selected control of the two-way switches 14, 18. The second battery 13 is connected in series to the load 6 through selected control of the two-way switches 16, 19. In this switching configuration the first battery 4 is not connected to the load 6, and the second battery 13 is not connected to the power source 10.

In this example the control unit 12 of the power supply system 2 supplies a switching signal SW2 to the two-way switches 14, 16, 18, 19 in order to switch between the first battery 4 being connected to the load 6 and the second battery 13 being connected to the load 6. In this way, only one of the batteries 4, 13 is arranged to discharge by supplying a current to the load 6 at any one time. The first battery 4 is in the discharge state whilst the second battery 13 is in the rest state, and the first battery 4 is in the rest state whilst the second battery 13 is in the discharge state. The control unit 12 is also arranged to generate a power control signal PC2 to control the power source 10 in order to supply an electric current to each of the batteries 4, 13 during a portion of their respective rest states.

Voltmeter 5a measures the voltage of the first battery 4, and voltmeter 5b measures the voltage of the second battery 13, during their respective rest states. These voltage values are provided to the control unit 12 in signals VS1 and VS2 such that the control unit 12 can determine if the voltage of each battery reaches a minimum threshold voltage during the rest phase of that battery.

If the minimum voltage threshold is met during the rest state then the switching cycle for the power supply system 2 shown in FIGS. 3A and 3B is equal and symmetric between the discharge and rest phase; thus $T_{on}=T_r$. In this case the duty cycle of the switching signal is 50%.

However, when the voltage threshold is not met for a particular battery 4, 13 during its rest state then the rest period of that battery 4, 13 is extended until the open voltage of that battery reaches the minimum voltage threshold. In the embodiment shown in FIG. 3B, an increase in the length of the rest period of one battery leads to an increase in the discharge phase of the other battery, in order for a continuous current output from the respective batteries 4, 13, with the load 6 alternately supplied with current from the first battery 4 and the second battery 13. Advantageously, this is useful for systems requiring a continuous supply of power.

Initially the length of the rest period $T_r$ is equal to the length of the discharge period. However, once the voltage drops below the minimum threshold value the length of the rest period can be extended.

In some embodiments, the length of the rest period $T_r$ can be extended based on monitoring the recovery of the voltage of the battery 4, 13 when the battery is in the rest state.

Taking $t_0$ as the instant at which the rest period begins, $V_0$ is the voltage value of the cell measured at the instant in which there is no current flow through the battery when the battery voltage then starts to rise, said voltage defined by the product of the current previously circulating and the battery internal resistance The voltage of the battery is then measured every 5 s to determine a series of voltage values at each of the points in time ($V_0$, to =0; $V_1$, $t_1$=5 s; $V_2$, $t_2$=10 s, ... ). Thus, at a given time period $\Delta t_{x,x+1}$ there is a voltage variation $\Delta V_{x,x+1}$. The value of the rest period $T_r$ is then extended until the point where the following condition is met:

$$\frac{\Delta V_{x,x+1}}{\Delta V_{0,1}} < 0.2$$

Thus, when the ratio of 0.2 is reached the rest period is no longer extended and the battery reverts to the discharge state. This time period of when the ratio is reached is the optimum rest period for a battery for that particular discharge cycle. This is because once this condition is satisfied any increase in the recovery of the battery voltage becomes negligible.

This process is then repeated for each pulse discharge cycle, with the value of $\Delta V_{0,1}$ measured for the first discharge cycle taken to be the same for each of the subsequent pulse discharge cycles. In this way there is a variable rest period that is optimised for each pulse discharge cycles.

Alternatively, the state of charge (SoC) and/or depth of discharge (DoD) may be measured and used as the threshold condition for increasing the length of the rest period, with the aim of maximizing recovery for the voltage of the battery during the rest state. Other threshold conditions may instead by used, such as directly determining if a minimum voltage at a certain point in time is met.

In other embodiments, the ratio in the equation above need not necessarily be 0.2. For instance, if a different rest period is desired, such as longer or shorter rest periods, which may involve further improvements in efficiency.

The configuration described in the embodiments can readily be scaled to integrate more than two batteries operating in a coordinated way so that at any given time, only a portion of batteries are in a discharge stage while the others are in a rest stage during which a current is supplied by the power source.

The configuration of batteries can also be adjusted to supply any specific current signal to the load. For instance, where a constant supply to the load is not required, the length of the discharge phase of the batteries may be kept constant, even when the length of the rest period is increased due to the threshold voltage not being met.

Figure 4:
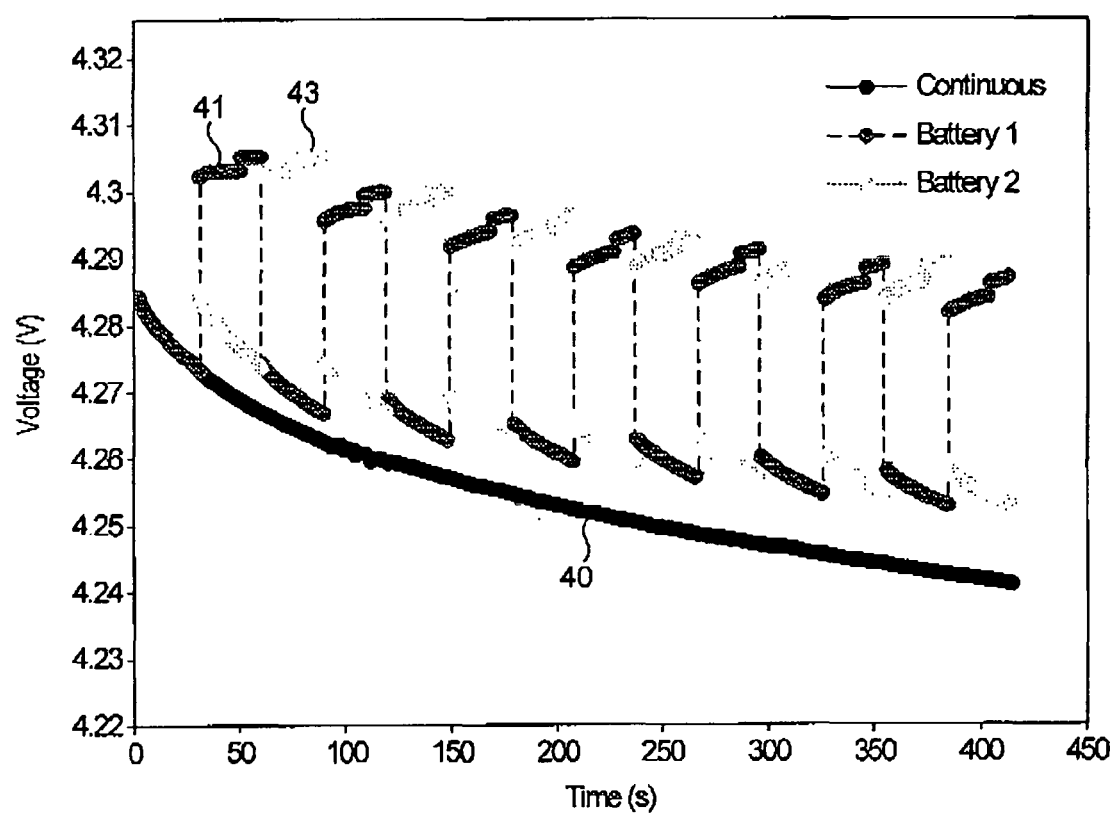
FIG. 4 is a graph showing a section of a voltage versus time discharge curve for the system shown in FIGS. 3A and 3B without a variable rest period, and for a continuous discharge system.

FIG. 4 is a graph showing the voltage across the first and second batteries 4, 13 versus time in a device using pulse discharge where the rest period is not varied; these are shown in trace 41 and trace 43 respectively. A trace 40 is also shown for the voltage across a conventional battery versus time, where there is no pulsed discharge. In a conventional battery discharge the voltage across the battery gradually decreases over time. The traces 41, 43 for the first and second batteries 4, 13 follow the shape of FIG. 2A for a single switching cycle. However, the traces 41, 43 are out of phase such that the first battery 4 is in its rest state while the second battery 13 is in its charging state, and vice-versa. In each successive switching cycle the respective voltages across the first and second batteries 4, 13 are lower than in the previous cycle. Thus, there is a downward trend in the voltage values for successive switching cycles in the traces 41, 43. However, the downward trend in voltages is less for traces 41, 43 than for trace 40 which represents a conventional battery discharge. This indicates an improved efficiency of operation for the first and second batteries 4, 13 using the described charge/discharge cycle with fixed rest period.

Figure 5:
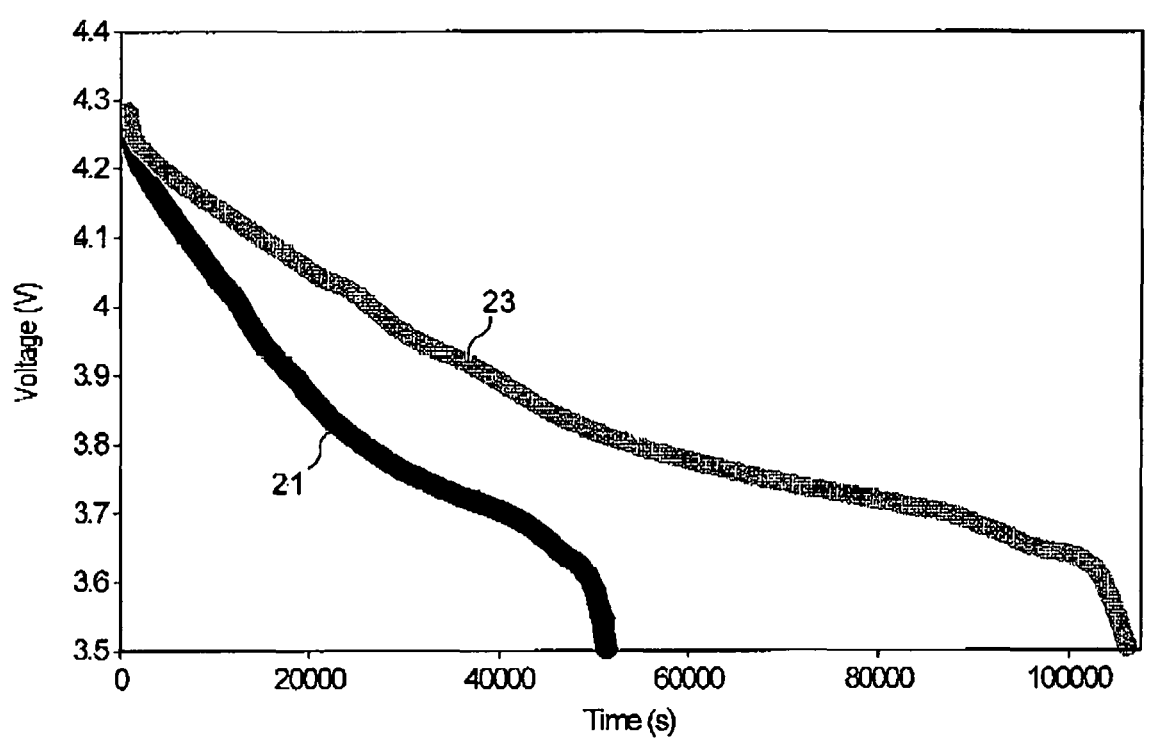
FIG. 5 is a graph showing a complete discharge profile of a voltage versus time discharge curve for the system shown in FIGS. 3A and 3B without variable rest period, and for a continuous discharge system.

FIG. 5 is another graph showing the voltage across the first and second batteries 4, 13 over a longer time period. A plot is also shown for the voltage across a conventional battery versus time, where there is no pulsed discharge. The trace 23 represents the voltage across the first and second batteries 4, 13; this corresponds to the traces 41 and 43 shown in FIG. 4, but over an extended time period, i.e. having a fixed rest period. The trace 21 shows the voltage across a conventional battery with no pulsed discharge. As can be seen from FIG. 5 the trace 23, representing the voltages of the first and second batteries 4, 13, has a much shallower gradient.

For the first example power system shown in FIGS. 1A and 1B, and the second example power system shown in FIGS. 3A and 3B, the power source 10 can be configured to supply current to the battery 4 at any point during the rest period of a battery. More specifically, the intermediate injection charging period $T_{ON}$ can be set to occur at any point during the rest period $T_r$ of that particular battery. In alternatives, the control unit 12 may control the power source 10 to supply electricity to the respective battery 4, 12 during the entire rest period, at the end of the rest period, at the beginning of the rest period, only during a portion of the rest period. There could also be intermittent charging during the rest period; this may include at the end, at the beginning, or at various times throughout the rest period. In the case of the current being intermittently supplied during the rest period the current may be supplied for various time periods during one rest period.

A number of alternative timing schedules may be applied by the control unit 12. In one arrangement the discharge period may last from 5 to 100 seconds. The rest period may have a duration of 1 to 180 s. The current injection period may have a duration of 1 to 100 s. A further rest period may be provided at the end of the current injection period with a duration of 0-5 s. The current supplied to the battery 4 by the power source 10 during the current injection period may be less than 70% of the current provided by the battery 4 to the load 6 during the discharge period.

The efficiency of the power supply system can be determined in a number of different ways:

The net energy delivered by the battery during discharge may be calculated as follows:

$$E_{net} = E_{on} - E_{ON}$$

Where $E_{on}$ is the total energy delivered to the load, measured starting from when the battery has its nominal voltage down to its minimum value, and $E_{ON}$ is the energy supplied by the partial charges of the battery. Where $E_{ON}=0$ in the case of continuous discharge. Starting from the net energy, the discharge efficiency may be defined as the ratio between the net energy discharge of the switched battery power supply system ($E_{net,M}$) and the net energy of the continuous discharge battery ($E_{net,C}$).

$$\eta_{discharge} = E_{net,M}/E_{net,C}$$

Discharge/charge cycle efficiency:

$$\eta_{cycle} = E_{on}/(E_{ON} + E_{charge})$$

Where $E_{charge}$ is the energy required to charge the battery up to the initial voltage (arbitrarily set). As can be seen above the energy provided by the power source during the intermediate charging phase is taken into account in these calculations.

Amperometric efficiency:

$$\eta_a = \frac{\int i_{on}}{\int i_{ch}} = \frac{Q_{on}}{Q_{ON} + Q_{charge}}$$

Where $i_{on}$ is the discharge current, and $i_{ch}$ is the battery charge current. $Q_{on}$ is the charge supplied by the battery to the load during the discharge state, $Q_{ON}$ is the total partial charge supplied to the battery during the current injection periods, and $Q_{charge}$ is the total final charge required to bring the battery to its nominal voltage value.

We note that when a current is passed through a battery gas is generated; this reduces the amperometric efficiency by limiting the electrical current flowing outside the battery.

Figure 6:
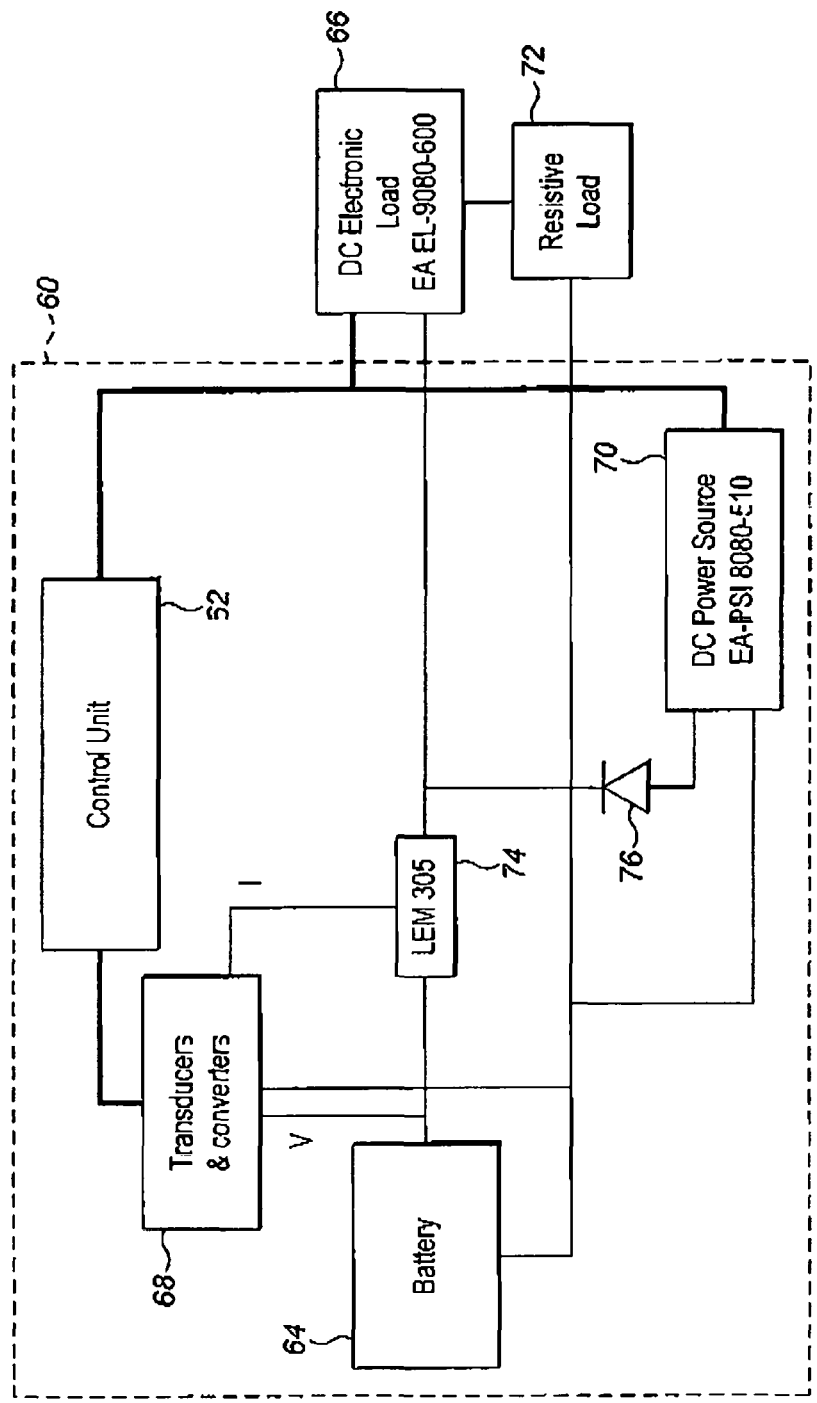
FIG. 6 shows a further example power supply system in an embodiment.

Example test results achieved using embodiments will now be demonstrated. FIG. 6 shows an example power supply system 60 according to an example embodiment that has been used for said tests. It includes control unit 62 which is a central computerised system, running a proprietary dedicated software developed in environment Labview. The control unit 62 is configured to supervise all the connected devices. DC power source 70 is a programmable DC power supply model DC EA-PSI 8080-510. This is configured to apply the injection current during the rest phase of battery 64, and also to provide the full recharge of the battery 64.

Diode 76 has its anode connected to the positive output of the power source 70 and its cathode connected to the positive pole of the battery 64. This is to provide decoupling the output of the power source 70 from the battery 64.

The load of this circuit comprises two contributions. The first is active electronic load 66, (EA EL9080-600). The second component of the load is a power resistor array 72 capable to dissipate a maximum power of 9.4 kW. The resistors enable the active load to dissipate for a longer duration. The active electronic load 66 and the resistor array 72 are in series with each other. Control unit 62 supplies the loads with current from battery 64. This set up enables discharge currents of up to 250 A to be achieved.

Transducers and converters 68 and 74 enable current and voltage measurements to be taken. These include dedicated transducers and analogue to digital converters with 16 bit of resolution, at concurrent sampling (model DAQ NI9215). These measurements are provided to the control unit 62.

Battery 64 is of the lead acid type (model 10OPzS1000 produced by TAB), being one cell of 2V nominal voltage having 10 plates of 100 Ah. The nominal capacity is 1000 Ah, with a discharge current of 100 A, a full discharge is achieved in 10 hours, and at 250 A a full discharge is achieved in 3 hours at continuous discharge. In the present experiments 20 cells are connected in series.

Figure 7A:
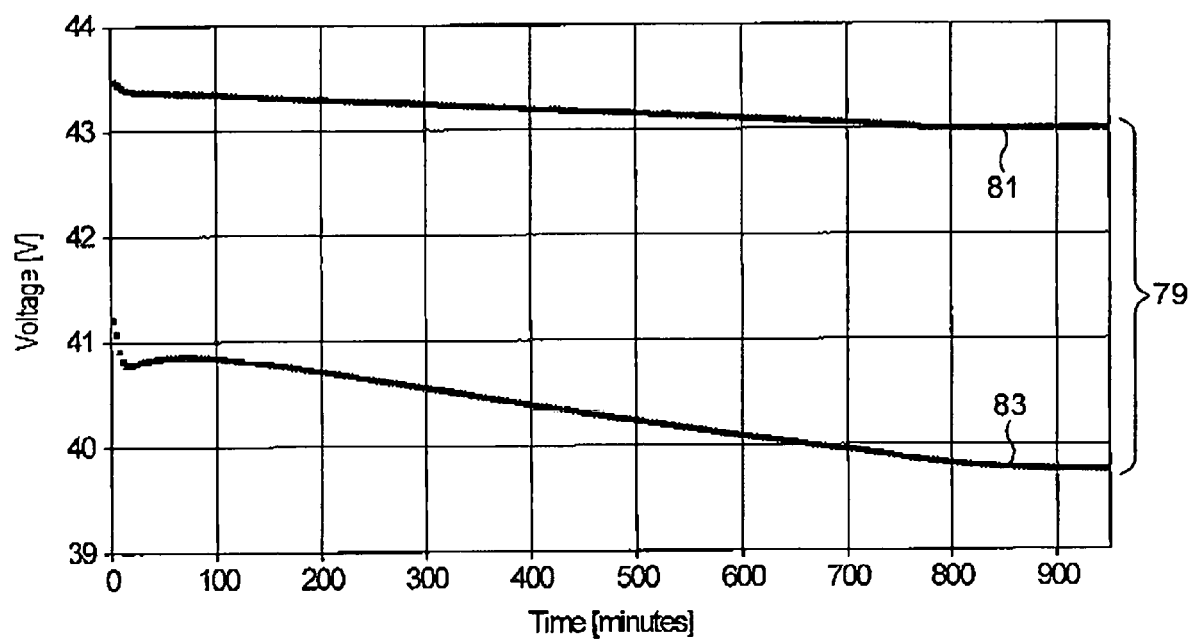
FIG. 7A shows a graph showing a section of a voltage versus time discharge curve for the system shown in FIG. 6 with a variable rest period showing the maximum and minimum voltage envelope.
Figure 7B:
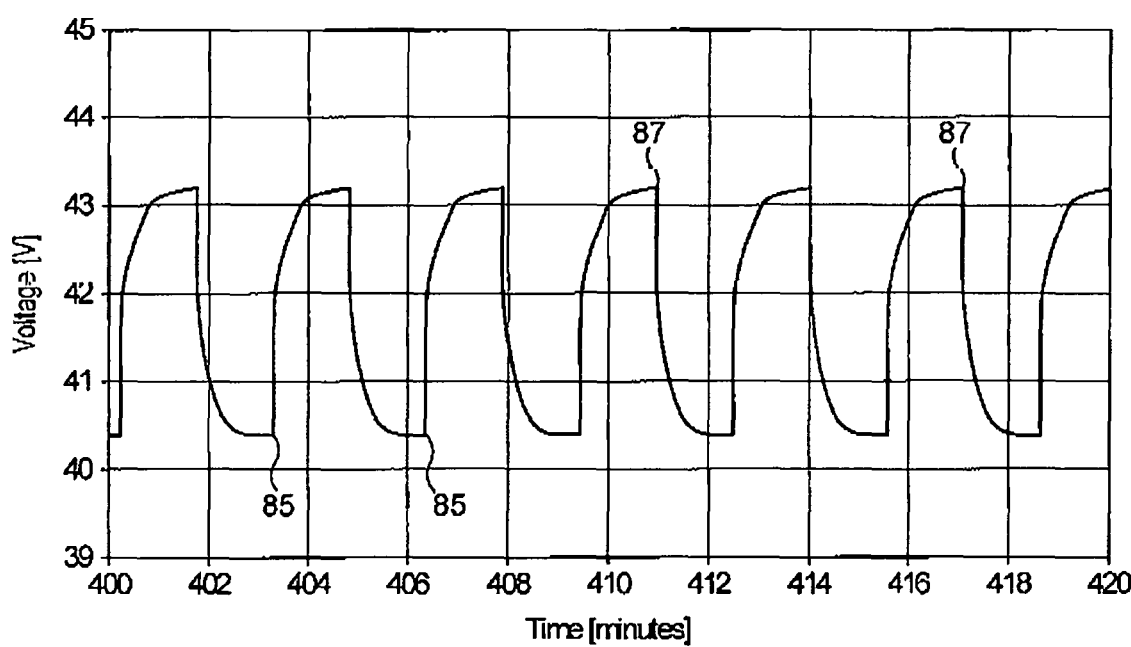
FIG. 7B shows a zoomed in section of the graph of a portion of FIG. 7A showing the voltage profile.

For all of the results, multistep potentiometric analysis has been selected. The current is set constant in the time interval selected and the battery voltage evolution is recorded (data sampling time=1 s). It has to be noted that the voltage measured has two contributions ($V_m=V+\psi$): the battery voltage V and the ohmic contribution $\psi=I*(R_{int}+R_c)$ due to battery internal resistance ($R_{int}$) and contact resistance ($R_c$). In order to have higher accuracy in the results obtained the contacts have been optimized to reduce this contribution. Energy calculation is performed from the current and voltage data recorded from the instrument. The Rectangle method has been employed for the area calculation under the voltage curve evolution over time interval (V-t graph); the quantity obtained is subsequently multiplied by the charge/discharge current. By definition, the energy corresponding to a single sampling interval is equal to $E_s=V_m*A*T_C$ [Joule].

voltage reached during the rest period, and the minimum voltage 83 i.e. the voltage reached during the discharge period. Only the voltage envelope is shown in FIG. 7A, however the voltage will vary between each of the maximum voltage 81 and the minimum voltage 83 throughout the discharge cycles. FIG. 7B shows a zoomed in section of voltage verses time graph between 400 minutes and 420 minutes corresponding to that shown in FIG. 7A. FIG. 7B unlike FIG. 7A shows the voltage at each point throughout the discharge cycle, similar to FIG. 4. FIG. 7B shows the minimum voltage 85 and the maximum voltage 87, and the change in the voltage between successive pulse discharge cycles.

TABLE 1

| Test | Partial charge current | Minimum threshold Voltage | Test Duration | $T_1$ | $\eta_{cycle}$ | $\eta_a$ | |
|---|---|---|---|---|---|---|---|
| 1 | N/A | N/A | 8 hrs | N/A | 0.832 | N/A | Discharge at continuous current |
| 2 | N/A | N/A | 17 hrs | 92 s | 0.845 | N/A | Pulse discharge - no injection current during rest phase |
| 3 | 115 A | N/A | 8 hrs | 92 s | 0.879 | 0.959 | Pulsed discharge with injection current during rest phase |
| 4 | 200 A | N/A | 5 hrs | 92 s | 0.873 | 0.957 | Pulsed discharge with injection current during rest phase |
| 5 | 200 A | N/A | 5 hrs | 92 s | 0.871 | 0.954 | Pulsed discharge with injection current during rest phase |
| 6 | 70.6 A | 43 V | 16 hrs | Variable (min 92 s) | 0.900 | 0.980 | Variable $T_r$ |
| 7 | 70.6 A | 44 V | 24 hrs | Variable | 0.926 | 0.996 | Variable $T_r$ |
| 8 | 70.6 A | 44 V | 96 hrs | Variable | 0.933 | 0.997 | Variable $T_r$ |
| 9 | 70.6 A | 44.2 V | 24 hrs | Variable | 0.927 | 0.999 | Variable $T_r$ |

The experimental results shown in Table 1 indicate an increase in terms of efficiency of the charge/discharge cycle of the power supply system using a variable T period according to embodiments (experiments 6 to 9), with respect to the continuous cycle (experiment 1), pulse discharge (experiment 2) and pulse discharge with injection current during the rest phase (experiment 3 to 5), as indicated by a larger $n_{cycle}$. The power supply system with variable $T_r$ can also provide higher amperometric efficiencies, indicated by the larger $n_a$ when using a variable rest period. This is an unexpected and advantageous effect.

For any given battery and battery configuration, the parameters that affect the efficiency of operation may be: the length of switching cycle, the discharge current, the charging current, the combination of the three periods ($T_{on}$, $T_{ON}$ and $T_{OFF}$) considered in terms of duration and sequence, and the value of the minimum threshold voltage. By varying these parameters it may be possible to optimise efficiency in different operational conditions.

FIG. 7A shows a graph of the voltage across the battery over time for Test 6 shown in Table 1, having a switching cycle with variable rest phase. FIG. 7A shows the voltage envelope 79, showing the maximum voltage 81 i.e. the The experiment in FIG. 7A employs a pulsed discharge current of 115 A, a constant value of $T_{on}$ of 92 s, a minimum rest period ($T_r$)=92 s, of which the current injection period $T_{ON}$=32 s. The minimum threshold voltage during the rest period was set to 43 V (rather than using the inequality previously shown). Once the battery voltage reaches a maximum value of 44 V during the application of the injection current, said injection current is stopped. As can be seen the experiment was carried out for a duration of 16 hours using repeated pulse discharge cycles. At the end of the test a full charge has been applied to the battery to get it back to its nominal voltage.

It is also noted that for experiments 4 and 5, with a fixed rest period, that value the current of the injection current (200 A) is higher than that for the discharge cycle (115 A). However, in these experiments as the injection current is only supplied for a short time period, the overall charge supplied by the injection current during each cycle is less that the charge supplied by the discharge of the battery during each cycle.

As can be seen, the injection current for experiments 6 to 9 have a value of 70.6 A, whereas the discharge current is larger at 115 A. Again the injection current is only supplied for a portion of the rest period. To account for the variable rest period the injection current is lower than in experiments 4 and 5. However, the charge supplied by the injection current during each cycle is less that the charge supplied by the discharge of the battery during each cycle.

As can be seen, unlike the continuous charge and the pulse discharge with fixed rest period as shown in FIG. 5, the voltage of the battery when using variable rest period enables the charge of the battery to be maintained at a much higher level. Thus, after the 16 hour experiment the battery still has a high state of charge, which is not possible for a continuous discharge or a pulse discharge (with or without injection current) without a variable rest period.

Figure 8:
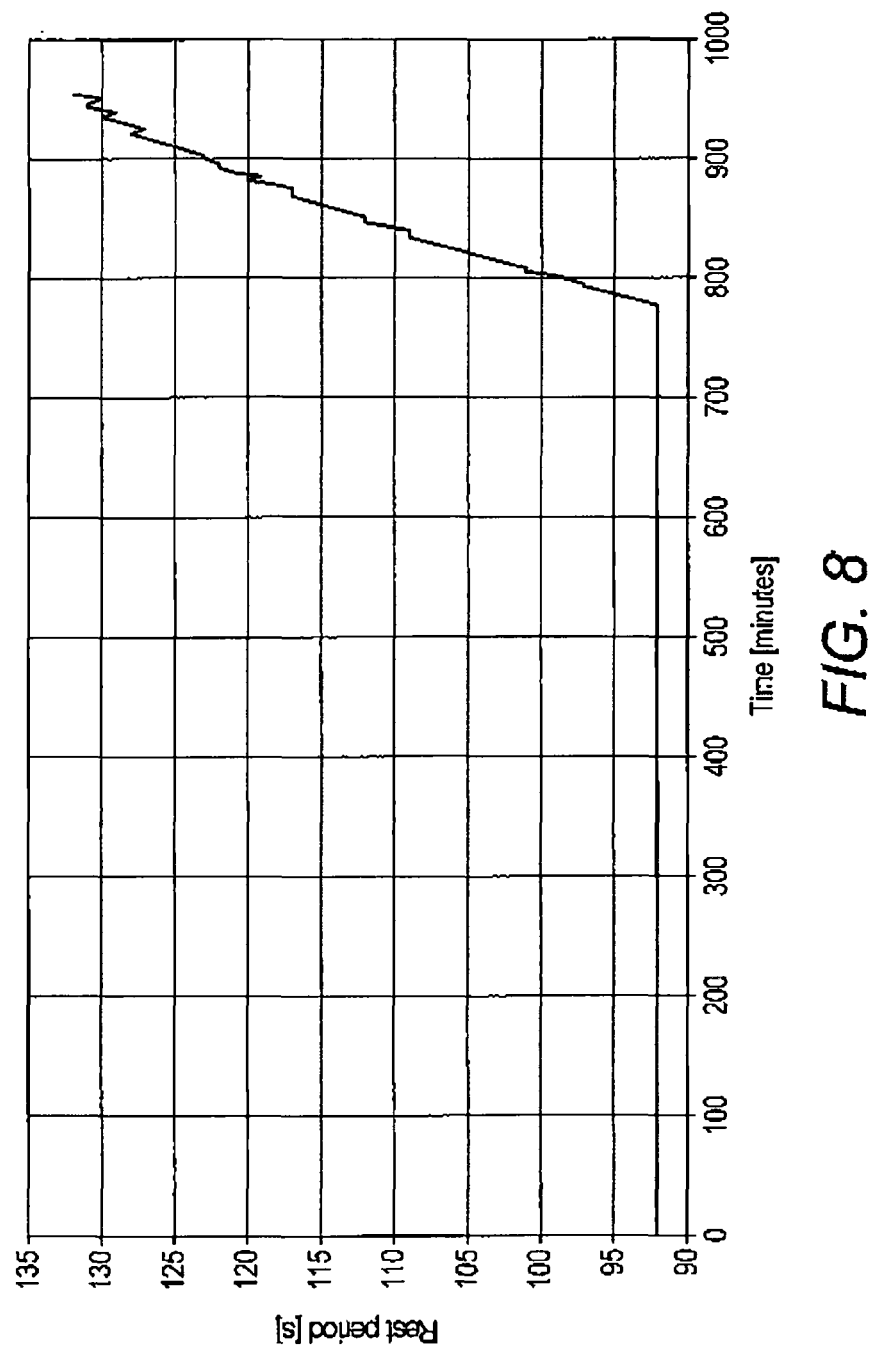
FIG. 8 shows a graph showing variation of the length of the rest period over time for the discharge curve shown in FIG. 7A.

FIG. 8 shows a graph of how the value of the rest period varies for the Test shown in FIG. 7A. It can be seen that between t=0 and t=750 minutes the rest period is constant at 92 s. During this time the voltage of the battery during the rest period exceeds the minimum threshold voltage of 43 V. However, after t=750 minutes the length of the rest period progressively increases for successive cycles, due to the fact that the voltage of the battery measured during the rest period does not reach the minimum threshold voltage of 43V before expiry of the minimum rest period of 92 s.

Figure 9:
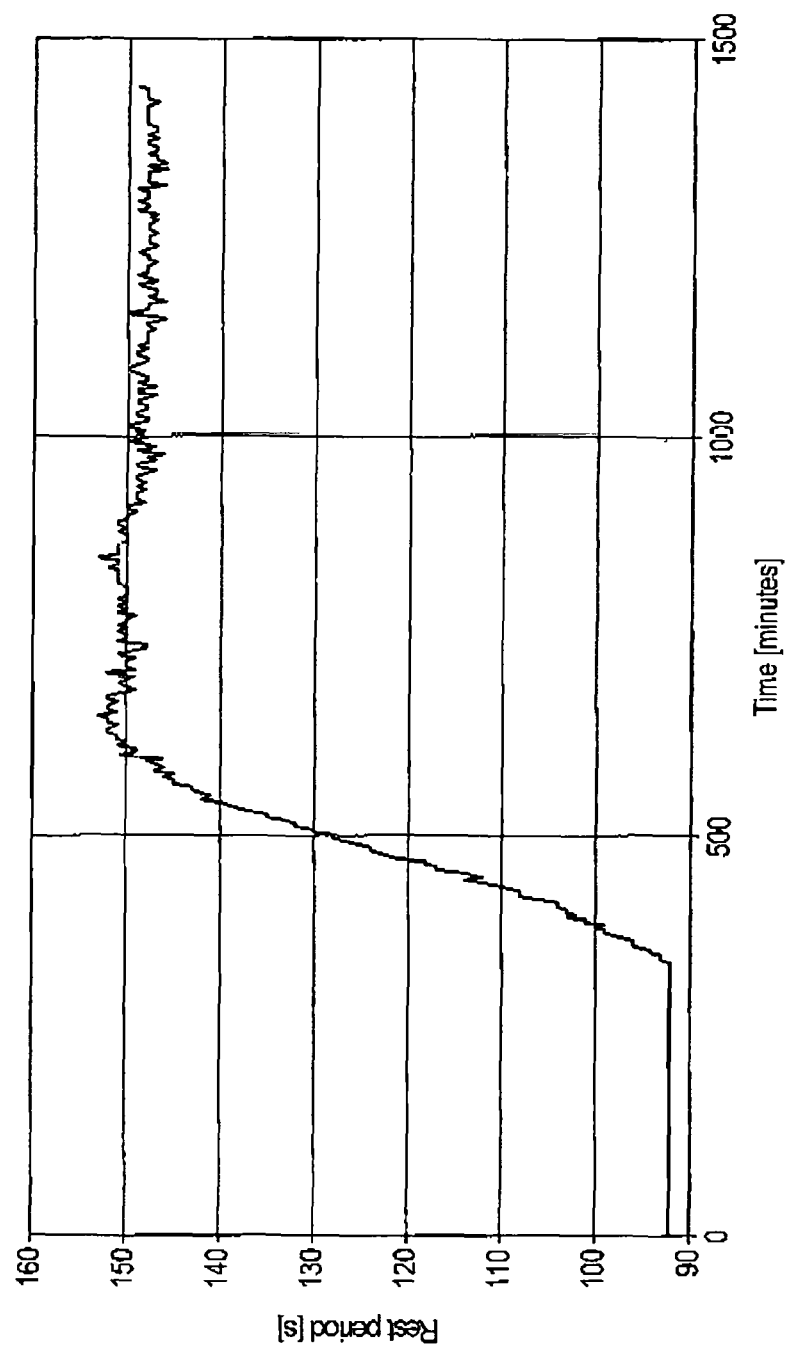
FIG. 9 shows a graph of variation of the length of the rest period over time for a further example discharge curve.

It has been found that if the experiment is run for long enough, after so many cycles the variable rest period will eventually plateau and reach a steady state. This is shown in FIG. 9. As can be seen the rest period starts to increase at around t=400 minutes and reaches a steady state of 150 s at t=600 minutes.

Figure 10:
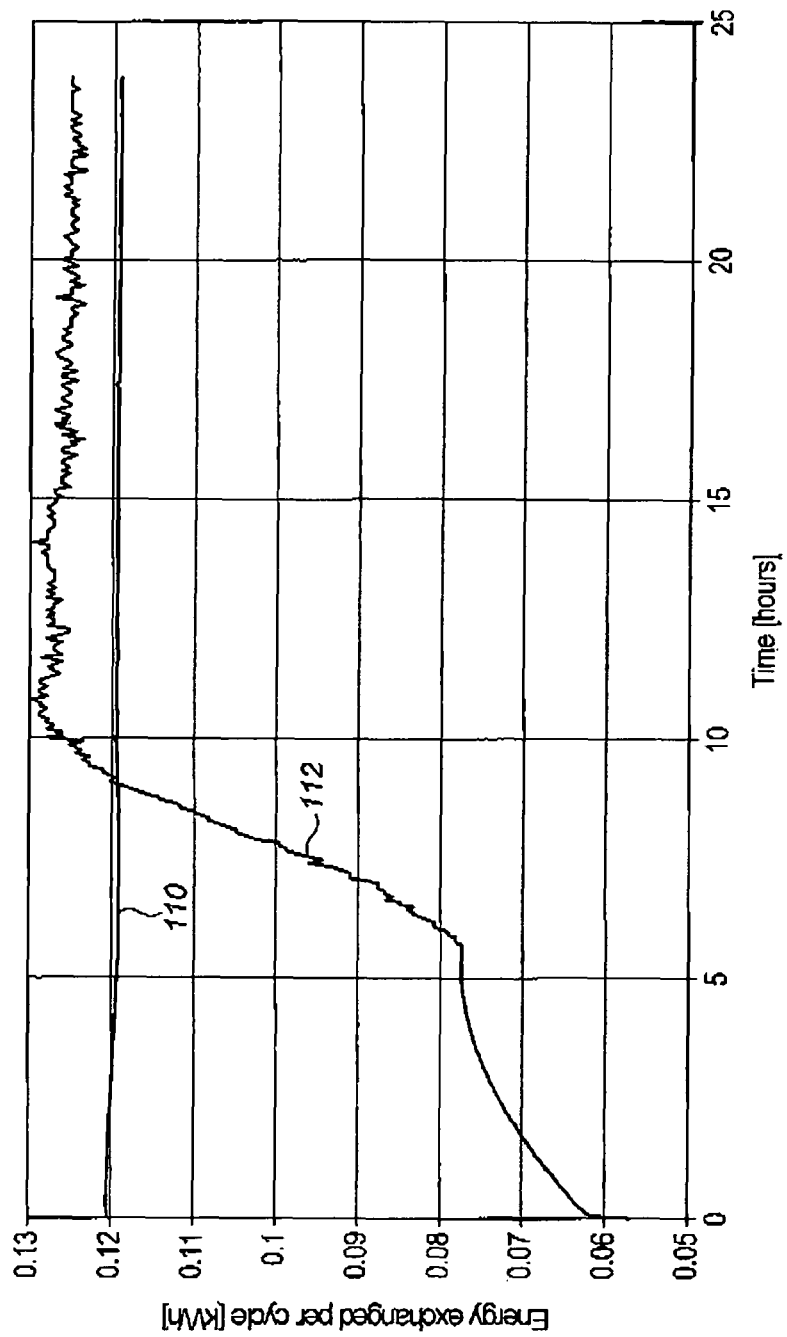
FIG. 10 shows a graph of the energy exchanged per cycle for the test shown in FIG. 9.

FIG. 10 shows the energy exchanged per cycle for the experiment shown in FIG. 9 over the length of the experiment. Plot 110 shows the energy delivered by the battery for each discharge cycle, and plot 112 shows the energy applied by the injection current for each cycle. It can be seen that the energy applied by the injection current for each cycle increases over time until it plateaus at t=10 hours, in line with the plateau of the variable rest period shown in FIG. 9.

It can be seen from FIG. 10 that once the steady state is achieved the energy applied by the injection current for each cycle is slightly higher than the energy delivered during the discharge period for each cycle. Keeping the battery state of charge constant cycle after cycle implies that the energy applied by the injection current has to be higher than the discharge current. This is due to power losses generated by the current flow (both charge and discharge) and internal battery power losses due to the internal battery resistance, and any external power losses due to the cell interconnections. In the present case these differences are noticeable as current values can be in excess of 100 A. However, the present power supply system and methodology results in better efficiencies, as explained above.

Figure 11:
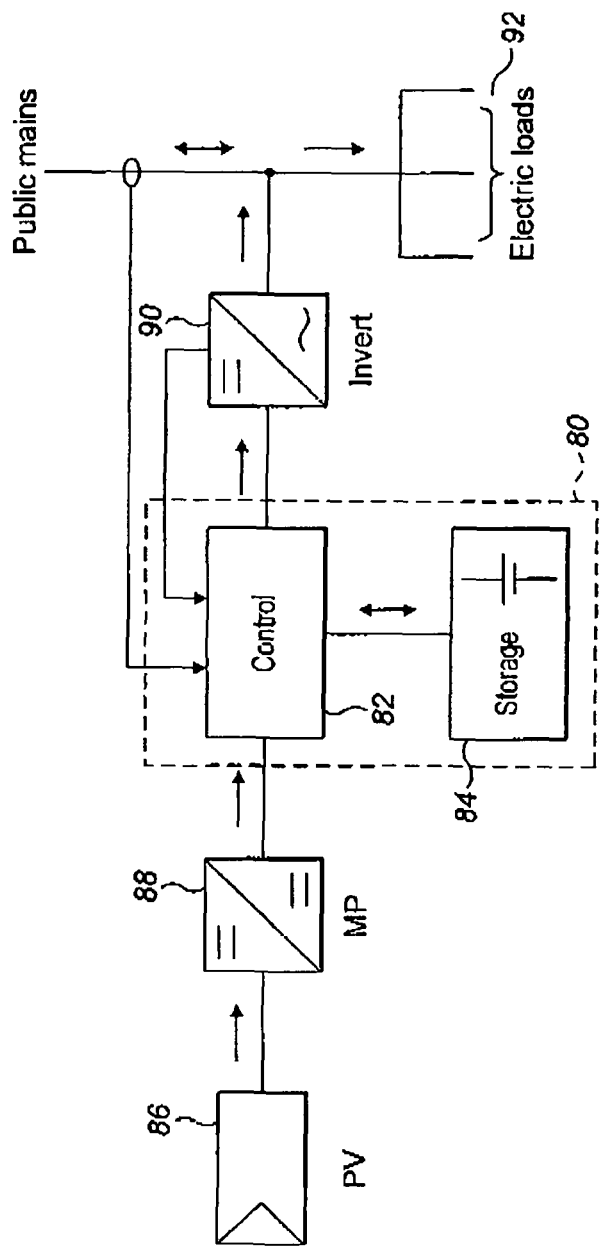
FIG. 11 shows an example photovoltaic system showing one example of the type of system that can be used in conjunction with an example power supply system of embodiments.

FIG. 11 shows an example photovoltaic system showing one example of the type of system that can be used in conjunction with an example power supply system 80 of embodiments. FIG. 11 shows a photovoltaic device 86 (such as a solar panel), connected to a maximum power point tracking circuit 88, which is connected to power supply system 80. The power supply system 80 includes control unit 82 connected to energy storage block 84. The power supply system 80 is connected through inverter 90 to the public mains which supply loads 92.

The MPPT (Maximum Power Point tracking) circuit 88, is embedded into a dedicated DC-DC converter, and can maximise the instantaneous energetic efficiency that would otherwise be extremely variable due to the constantly changeable exposure to solar radiation of the photovoltaic device 86 and the required load conditions.

The control unit 82 oversees both the charge of the energy storage block 84 and the management of the inverter 90. This enables the power supply system 80 to perform the pulse discharge method of embodiments.

The inverter 90 delivers energy to the mains from the photovoltaic device 82 or from the storage block 84. A portion of the energy from the photovoltaic device 86 may also be used as the source of the injection current applied to the energy storage block 80 when it is in its rest phase. This for instance could be a public grid, or a private grid such as a power station dedicated to refill electrical energy for electrical vehicles. In some cases the DC-AC inverter 90 could be replaced with a simpler DC-DC converter as some electrical vehicles only accept DC charge.

The loads 92 can be of various nature, domestic and industrial, resistive, capacitive and inductive. The energy storage unit 84 consists of batteries connected in series and/or parallel, depending on the capacity required and the voltage and current parameters needed.

Figure 12:
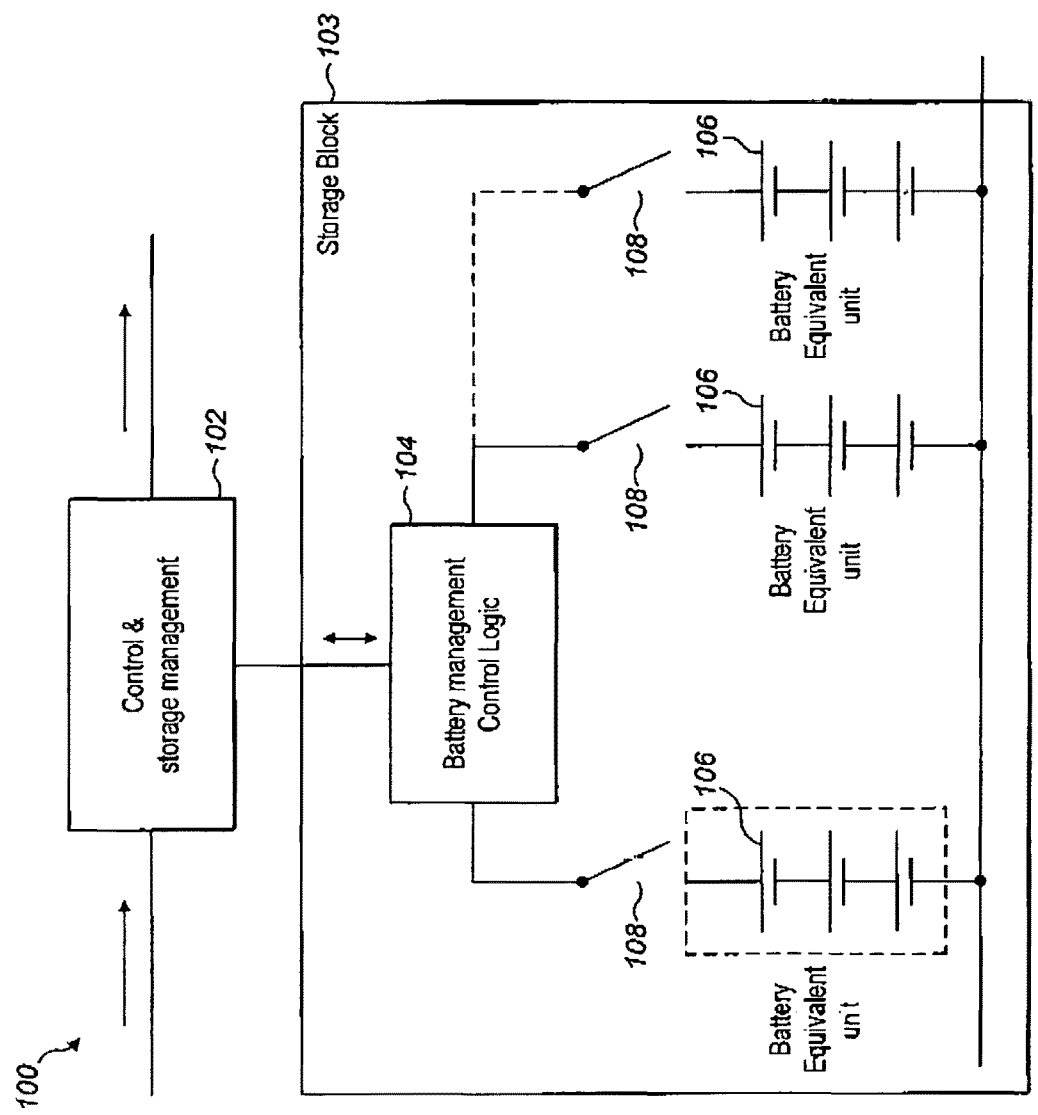
FIG. 12 shows a further example power supply system in an embodiment.

FIG. 12 shows an embodiment of an example power supply system 100 according to embodiments. FIG. 12 shows an energy storage block 103 having three battery units 106 connected in parallel, each battery unit comprising three cells connected in series. The battery management control logic 104 controls the switches 108 connecting the battery units 106 to implement the pulse discharge method of embodiments. The control unit 102 further controls the power supply system 100 such that the power is supplied to the load (not shown) when the power from the storage block 103 is required.

The power supply system of embodiments can be used for both grid use (i.e. supplying power in excess of megawatts) or for micro grid use (smaller power networks).

For instance, the power supply system of FIG. 12 could be used as a charging station, such as for electric vehicles. This is an example of a micro grid. Typically loads connected to micro grids require high peaks of power at certain times. Placing the power supply system of embodiments in close proximity to charging points can provide the advantage of allowing a better management of peak power locally delivered, ultimately avoiding overloads and power cuts which could affect the mains supply.

The power source used to provide the battery with the injection current can be any type of device which is capable of providing an electric current to a battery. This could be any type of energy storage device that is capable of delivering a current over time, for instance a battery or a capacitor. The power source could also be any type of renewable energy source that is capable of supplying a current such as a photovoltaic system, or a wind turbine. The power source may provide DC or AC, depending on the requirements of the load 6. Where AC is required an inverter (not shown) may be provided.

The power source could alternatively be the output from a kinetic energy recovery system (KERS) where the kinetic energy generated during the breaking process can be captured and turned into electrical energy. Alternatively, the output of a combustion engine can cause an electrical generator to generate a current. This power supply system is suitable for use in hybrid and electric vehicles.

The control unit of embodiments can be a microcontroller, a microprocessor or a programmable logic device (for example, a FPGA=Field Programmable Gate Array). Preferably, the control unit and switch is implemented with a single component which is programmable logic device (for example FPGA) or an application-specific integrated circuit (ASIC).

The control unit may generate a switching signal with a low logic signal indicating the selection of a discharge phase and a high logic value indicating the selection of the rest phase. Alternatively the low logic signal may indicate rest phase and high logic signal may indicate discharge phase.

What is claimed is:

1. A power supply system for supplying an electrical load using pulse discharge, the system comprising;
   a first electrical battery for supplying said electrical load using pulse discharge; and
   a control unit configured to control the first electrical battery to pulse discharge by periodically switching between a discharge state of the first electrical battery, when the first electrical battery is connected to said electrical load, and a rest state of the first electrical battery when the first electrical battery is disconnected from said electrical load;
   said control unit being further configured to, during the pulse discharge, control a power source for supplying a first injection current to the first electrical battery during a rest period when the first electrical battery is in the rest state;
   said control unit further configured to determine, during the rest state of the pulse discharge, the voltage of the first electrical battery and, during the rest state of the pulse discharge, when the voltage does not meet a threshold value, increase the duration of the rest period until said threshold value is reached, wherein the control unit is further configured to control the power source such that said rest period has a fixed minimum duration even if the threshold value is met.

2. The power supply system according to claim 1, wherein the control unit is configured such that the threshold value is a minimum threshold voltage.

3. The power supply system according to claim 1, wherein the control unit is further configured to determine the voltage at fixed time intervals during the rest state to determine when the threshold value is reached.

4. The power supply system according to claim 3, wherein the control unit is further configured to determine the difference between the voltage determined at two consecutive time intervals, and compare the difference to the threshold value to determine when the threshold value has been reached.

5. The power supply system according to claim 1, wherein the control unit is configured such that the increase in the duration of the rest period involves increasing the length of time the injection current is applied.

6. The power supply system according to claim 1, further comprising:
   a second electrical battery,
   wherein the control unit is further configured to control the second electrical battery for periodically switching between a discharge state of the second electrical battery and a rest state of the second electrical battery.

7. The power supply system according to claim 6, wherein the control unit is configured to periodically switch between the first electrical battery and the second electrical battery to alternate between the discharge state of the first battery and the discharge state of the second electrical battery.

8. The power supply system according to claim 7, wherein said control unit is further configured to control the power source to supply a second injection current to the second electrical battery during a rest period when the second electrical battery is in the rest state.

9. The power supply system according to claim 8, wherein the electrical output across the load from the power supply system is substantially continuous.

10. The power supply system according to claim 6, wherein the control unit is further configured to determine the voltage of the second electrical battery during the rest state of the second electrical battery, and when the voltage does not meet the threshold value increase the duration of the rest period of the second electrical battery until said threshold value is reached.

11. The power supply system according to claim 1, wherein the power source is any of an electric motor, the output of an inverter, a kinetic energy recovery system (KERS), a photovoltaic panel, or a battery.

12. A control unit comprising;
    a processor; and
    a switching generator configured to generate a switching signal for periodically switching between a discharge state of a first electrical battery and a rest period when the first electrical battery is in a rest state;
    wherein the control unit is further configured to generate a power signal for controlling a power source to supply an injection current to the first electrical battery when the first electrical battery is in the rest state; and
    wherein the control unit is further configured to determine, during the rest state, the voltage of the first electrical battery, and, during the rest state, when the voltage does not meet a threshold value, increase the duration of the rest period until said threshold value is reached, wherein control unit is further configured to control the duration of the rest period such that said rest period has a fixed minimum duration even if the threshold value is met.

13. A method for supplying an electrical load using pulse discharge, the method including:
    supplying, by a first electrical battery, said electrical load using pulse discharge;
    controlling, by a control unit, the first electrical battery to pulse discharge by periodically switching between a discharge state of the first electrical battery, when the first electrical battery is connected to said electrical load, and a rest state of the first electrical battery when the first electrical battery is disconnected from said electrical load;
    during the pulse discharge controlling, by the control unit, a power source for supplying a first injection current to the first electrical battery during a rest period when the first electrical battery is in the rest state; and
    determining, by the control unit during the rest state of the pulse discharge, the voltage of the first electrical battery and, during the rest state of the pulse discharge, when the voltage does not meet a threshold value, increasing the duration of the rest period until said threshold value is reached, and controlling, by the control unit, the power source such that said rest period has a fixed minimum duration even if the threshold value is met.

14. The method according to claim 13, wherein the threshold value is a minimum threshold voltage.

15. The method according to claim 13, further including:
    determining the voltage at fixed time intervals during the rest state to determine when the threshold value is reached; and
    determining the difference between the voltage determined at two consecutive time intervals, and compare the difference to the threshold value to determine when the threshold value has been reached.

16. The method according to claim 13, wherein the increase in the duration of the rest period involves increasing the length of time the injection current is applied.

17. The method according to claim 13, further comprising:
controlling a second electrical battery for periodically switching between a discharge state of the second electrical battery and a rest state of the second electrical battery.

18. The method according to claim 17, further comprising:
periodically switching between the first electrical battery and the second electrical battery to alternate between the discharge state of the first battery and the discharge state of the second electrical battery; and
controlling the power source to supply a second injection current to the second electrical battery during a rest period when the second electrical battery is in the rest state.

* * * * *